United States Patent [19]

Ulrich et al.

[11] 4,438,617

[45] Mar. 27, 1984

[54] BELT TRACKING AND TENSIONING ARRANGEMENT

[75] Inventors: Lawrence W. Ulrich; Connie W. Walker, both of Bolingbrook, Ill.

[73] Assignee: Durable Packaging Corporation, Chicago, Ill.

[21] Appl. No.: 340,011

[22] Filed: Jan. 18, 1982

[51] Int. Cl.³ .............................................. B65B 61/00
[52] U.S. Cl. ........................................ 53/137; 53/374; 198/840; 198/627
[58] Field of Search ............... 198/627, 814, 840, 806; 53/374, 137; 83/817

[56] References Cited

U.S. PATENT DOCUMENTS

| | | | |
|---|---|---|---|
| 2,302,656 | 11/1942 | Dray | 198/814 |
| 2,413,265 | 12/1946 | Thompson | 198/814 |
| 2,753,039 | 7/1956 | Velten et al. | 198/814 |
| 3,422,953 | 1/1969 | Gates et al. | 198/814 |
| 3,687,790 | 8/1972 | Wehren et al. | 53/137 |
| 4,044,527 | 8/1977 | Ulrich et al. | 53/374 |
| 4,079,577 | 3/1978 | Ulrich et al. | 53/374 |

FOREIGN PATENT DOCUMENTS

| | | | |
|---|---|---|---|
| 897241 | 3/1945 | France | 198/814 |
| 583046 | 3/1975 | U.S.S.R. | 198/814 |

*Primary Examiner*—Joseph E. Valenza
*Assistant Examiner*—Kyle E. Shane
*Attorney, Agent, or Firm*—Dressler, Goldsmith, Shore, Sutker & Milnamow, Ltd.

[57] ABSTRACT

An endless belt tracking and tensioning arrangement which includes a control arrangement associated with one of the rollers to both maintain the tension in the endless belt and to provide a means of adjustment to such roller to compensate for imbalance of the tension forces on the endless belt.

10 Claims, 5 Drawing Figures

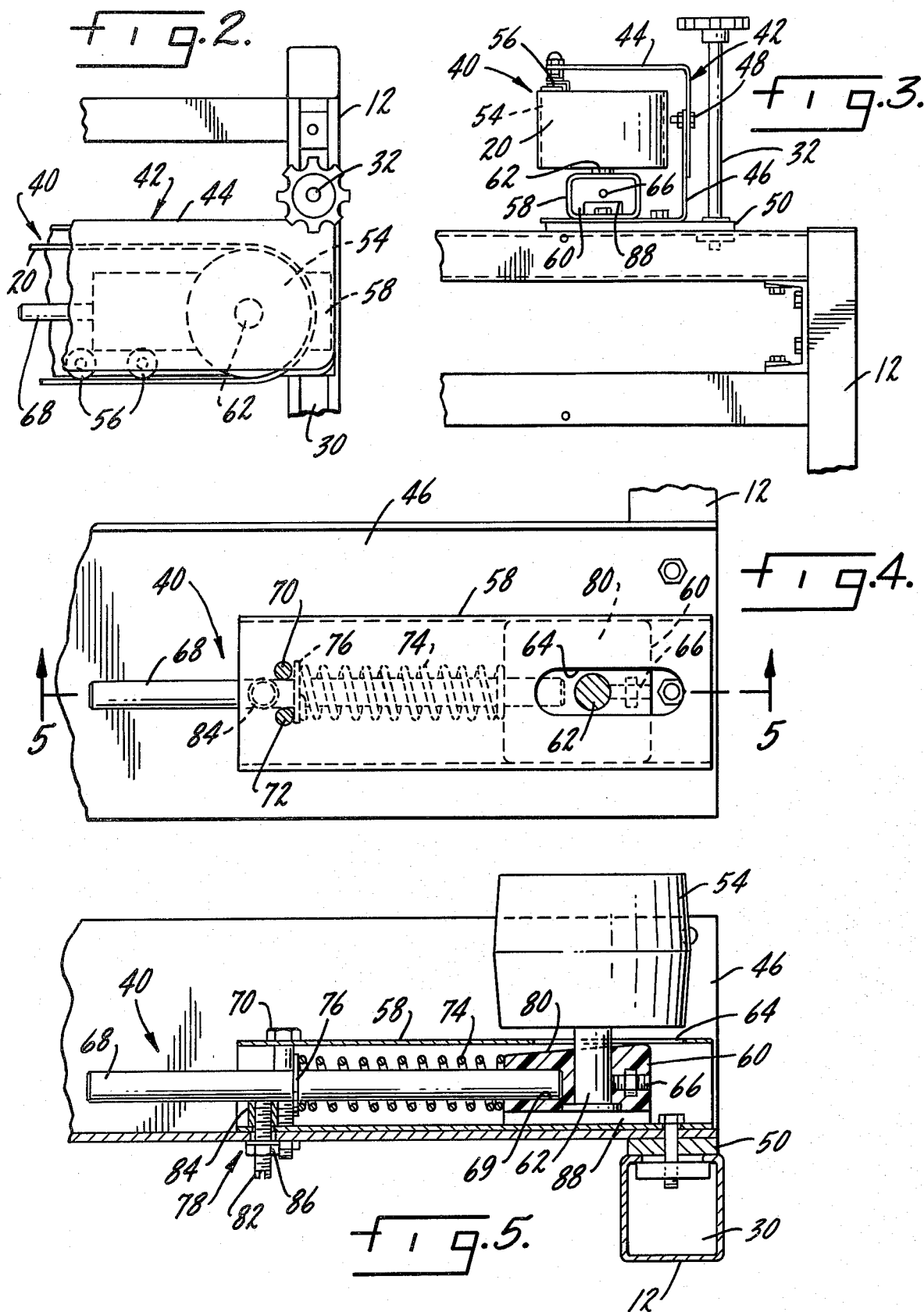

BELT TRACKING AND TENSIONING ARRANGEMENT

BACKGROUND OF THE INVENTION

The present invention relates to apparatus for sealing the foldable flaps of cartons by applying a self-adhesive tape material along the edges of the flaps, and more particularly to a belt tracking and tensioning arrangement for a belt arrangement for moving the carton through the apparatus.

In the packaging industry, corrugated and fiberboard cartons have been used for many years and various machines have been developed which are capable of sealing such cartons either by glueing the flaps, taping the flaps, or by stapling or otherwise providing fasteners to maintain the flaps in a closed position. Many of these machines are designed to accept cartons of random width and height by providing various types of means to control the transverse movement of the side arm assemblies associated therewith and the vertical movement of the top sealing means. An example of such a machine is disclosed in U.S. Pat. No. 4,079,577, having the same inventive entity and assignee as the present invention.

The present invention is directed to the endless belt arrangements associated with the side arm assemblies of such machines. The side arm assemblies function to contact the sides of the carton and move same through the machine, whereupon the flaps are sealed. The side arm assemblies may either be manually or automatically adjusted to accomodate cartons of random width dependent upon the particular machine. In either case, the side arm assemblies include a pair of longitudinally spaced rollers about which an endless belt is journalled for movement therearound. A motor is provided in communication with one of the rollers to rotate the roller and consequently drive the belt. The present invention is particularly directed to an arrangement to maintain tension in the endless belt and to maintain the belt on the rollers. If the rollers are slightly non-parallel or if the endless belt is not uniform, it will cause the belt to be in greater tension in one area than another. This unequal tension on the belt tends to cause the belt to move in one direction or the other. If the belt does not achieve a position wherein the tension forces are in balance, it will run off one end of the roller. It is known to provide adjustment means to skew one of the rollers so as to change its axis of rotation to compensate or balance the tension forces on the endless belt.

SUMMARY OF THE INVENTION

Briefly stated, the present invention provides a unique control arrangement associated with one of the rollers to both maintain the tension in the endless belt and to provide a means of adjustment to such roller to compensate for imbalance of the tension forces on the endless belt.

More specifically, the endless belt tracking and tensioning arrangement of the present invention includes an endless belt journalled for rotation about a first roller member and a second roller member. The first roller member is secured to a first shaft which in turn is rigidly secured to the side arm assembly and is suitably rotated by a motor. The second roller member rotates about a second shaft which in turn is movably mounted to the side arm assembly for movement towards and away from the first shaft. A longitudinally extending channel member is rigidly secured to the side arm assembly adjacent to the second roller member. A support block is positioned within the channel member and movable longitudinally therein. The second shaft extends into the channel member and is rigidly secured to the support block for movement therewith. A longitudinally extending control rod member is positioned within the channel member. The control rod member has a first end secured to the support block and a second end which extends towards the first roller member. A stop member is rigidly secured to the channel member intermediate the ends of the control rod member. A spring member is provided around the control rod member and extends between the support block and the stop member so as to bias the second shaft away from the first shaft. A skewing means, which includes a set screw member extending into the channel member for contact with the control rod member, is provided for selectively raising and lowering a portion of the control rod member, spaced from its first end, so as to pivot the support block about a transversely extending horizontal axis and thereby skew the second roller member relative to the first roller member.

DESCRIPTION OF THE DRAWINGS

FIG. 2 is a top plan view of the inlet end portion of the endless belt arrangement of the present invention;

FIG. 3 is an end elevational view of the portion of the endless belt arrangement shown in FIG. 2;

FIG. 4 is an enlarged top plan view of the inlet end portion of the endless belt arrangement with various parts removed to show structural details; and FIG. 5 is a sectional view taken along line 5—5 in FIG. 4 with the addition of the roller member.

DESCRIPTION OF A PREFERRED EMBODIMENT

Figure 1:
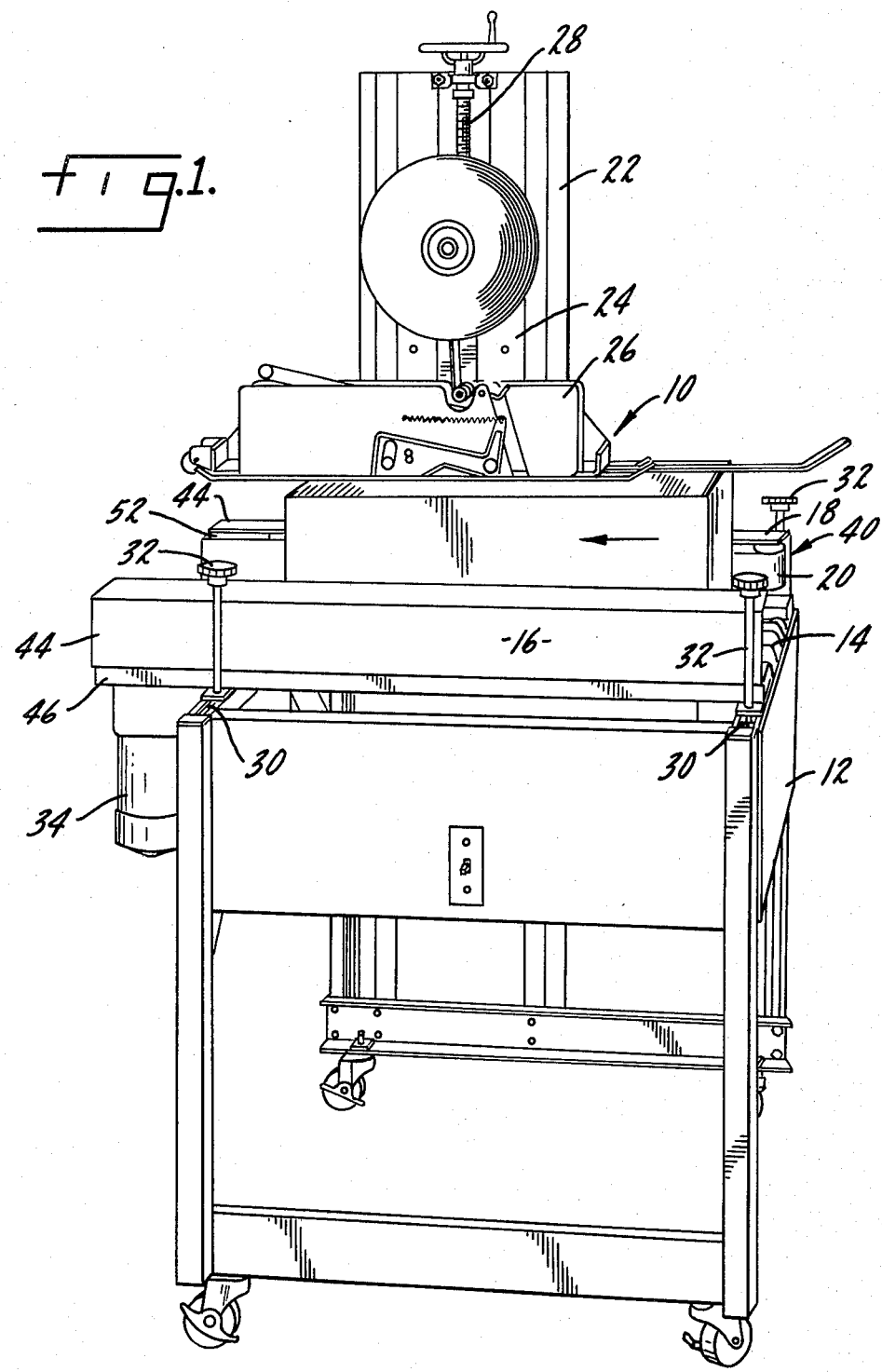
FIG. 1 is a perspective view of a carton sealing machine of the general type which employs the endless belt arrangement of the present invention.

Referring now in detail to the drawings and in particular to FIG. 1, the endless belt tracking and tensioning arrangement constructed in accordance with the present invention is contemplated for use in combination with a carton sealing machine of the general type indicated at 10. The brief discussion of carton sealing machine 10 which hereinbelow follows is for the purpose of generally disclosing a type of apparatus which the present invention is contemplated for use. It being understood that the present invention may be used in alternative types of apparatus.

Carton sealing machine 10 includes a frame structure 12 for support of a plurality of longitudinally spaced carton conveying rollers 14. A pair of transversely spaced and longitudinally extending side arm assemblies 16 and 18 are mounted to frame 12 above rollers 14. The side arm assemblies 16 and 18, of identical construction, are mounted so as to permit transverse sliding movement towards and away from each other. Endless conveyor belts 20 (only one of which is shown) are journalled for rotation around roller members associated with the side arm assemblies 16 and 18 in a manner which will hereinafter be discussed in further detail. Extending vertically upward from frame 12 is a structural vertical lift housing 22. Positioned within housing 22 is a vertical lift assembly 24. Lift assembly 24 is secured to a tape head assembly 26 and is effective to move the tape head assembly up and down above the frame 12. Lift assembly 24 is vertically positioned by a crank and screw arrangement 28, movably secured to housing 22 and rigidly secured to tape head assembly 26. Side arm assemblies 16 and 18 are mounted to transversely slide in channels 30 formed in frame 12 and retained in place by suitable locking members 32. A motor 34 is in communication with one of the rollers associated with each of the side arm assemblies 16 and 18 to drive the endless belts 20.

Briefly stated, the operation of carton sealing machine 10 is as follows. The elevation of the tape head assembly 26 is adjusted to accomodate the height of the carton and the spacing between side arm assemblies 16 and 18 is adjusted to accomodate the width of the carton. The carton is then fed into machine 10, in the direction of the arrow in FIG. 1, until the belts 20 contact the sides of the carton. The belts 20 remain in contact with the carton and move it past the tape head assembly 26 where a strip of sealing tape is applied across the top surfaces of the side flaps and the upper portions of the end side walls. The belts 20 continue to move the carton for delivery to an outlet conveyor (not shown).

Referring to FIGS. 2-5, the improved endless belt tracking and tensioning arrangement of the present invention is indicated generally at 40. Each of the side arm assemblies 16 and 18, and the endless belt arrangement 40 associated therewith, are of identical construction, one being the mirror image of the other. Accordingly, only the structural details of side arm assembly 18 will be disclosed herein.

Side arm assembly 18 includes a generally U-shaped, longitudinally extending, side arm support member 42 which is constructed from a top angle member 44 and a bottom angle member 46. Angle members 44 and 46 are secured together by fasteners 48 and are positioned such that the open side thereof faces the longitudinal center axis of the machine 10. The horizontal surface of member 46 is secured to a plate 50 at its respective ends, which in turn selectively rides on channel 30 through locking member 32. Thus, the support member 42 is free to slide transversely within the channels 30 associated with its respective ends, serving as a guide or track.

Positioned within support member 42 are a pair of roller members 52 and 54, of identical configuration, associated with the respective ends thereof. Although not specifically shown, drive roller member 52 is secured to a drive shaft which is driven by motor 34. Roller member 52 and the drive shaft associated therewith are mounted within support member 42 in a suitable manner which prevents the longitudinal movement thereof. The mounting of idler roller member 54 is associated with a novel aspect of the invention and will, accordingly, be discussed in further detail hereinbelow. Roller members 52 and 54 are oriented such that their axes of rotation are substantially vertical. As best seen in FIG. 5, the roller members are preferably tapered from the centers thereof towards their respective edges. Endless belt member 20 is journalled for rotation about roller members 52 and 54 such that the portion thereof which faces the longitudinal center axis of the machine 10 extends inwardly beyond the inner edges of support member 42. Extending downwardly from the upper surface of angle member 44, adjacent to the inner edge thereof, is a belt guide roller assembly 56, which extends intermediate the roller members 52 and 54, for contact with the portion of the belt 20 which contacts the sides of the carton being moved thereby. Assembly 56 serves to provide and ensure positive contact with the sides of the carton.

The present invention is particularly directed to the unique manner in which roller member 54 is supported within support member 42, so as to maintain tension in the belt 20 and to provide a means to maintain the belt 20 on the roller members 52 and 54.

Referring to FIGS. 3-5, a longitudinally extending channel member 58, of generally rectangular cross-section, is positioned within support member 42 and is rigidly secured to the horizontal leg of angle member 46, at the opposite end thereof from roller 52. A substantially rectangular support block 60 is slidably positioned within channel member 58. Support block 60 is preferably dimensioned such that it is relatively snuggly received within channel member 58 while still permitting longitudinal movement thereof within channel member 58. As best seen in FIG. 5, a stub shaft 62 is rigidly received within support block 60 and extends upwardly therefrom through an elongated slot 64 formed in the upper surface of channel member 58. Roller member 54 is suitably secured to shaft 62 in a manner which permits same to freely rotate thereabout. Shaft 62 is rigidly secured in place in support block 60 by use of a set screw arrangement 66 extending through the outer end of support block 60.

A control rod member 68 is longitudinally positioned within channel member 58 and is rigidly secured at a first end to block member 60 within a recess 69, formed in the inner end thereof, and the other end extends towards roller member 52. Control rod member 68 is substantially perpendicular to shaft 62 and parallel to the longitudinal axis of channel member 58. A pair of transversely spaced generally vertical bolt members 70 and 72 extend through the top and bottom of channel member 58 and through the horizontal leg of angle member 46. Control rod member 68 is sandwiched between bolt members 70 and 72, which serve to provide a guide for the vertical movement thereof in a manner which will hereinbelow become more apparent.

A spring member 74 is positioned around control rod member 68 and extends between support block 60 and the bolts 70 and 72. A washer 76 is slidably received around control rod member 68 between spring member 74 and the bolts 70 and 72. Spring member 74 serves to bias control rod member 68 and support block 60 and in turn shaft 62 and roller member 54 in a direction away from roller member 52. In so doing, spring member 74 is effective to maintain sufficient tension in endless belt 20 which is received around the roller members 52 and 54.

As briefly alluded to hereinabove, in accordance with the invention, means is provided to selectively skew the axis of rotation of roller member 54 relative to the axis of rotation of roller member 52. Referring in particular to FIG. 5, a set screw arrangement 78 is provided to control the raising and lowering of a portion of control rod member 68, spaced from the support block 60, so as to pivot the block 60 about a substantially horizontal axis and thereby skew roller member 54 secured thereto through shaft 62. In order to permit support block 60 to so pivot, the upper surface thereof, as indicated at 80, is inclined downwardly and inwardly. Set screw arrangement 78 includes a set screw 82 which extends through openings in the horizontal leg of angle member 46 and the bottom of channel member 58 a short distance inwardly of bolt members 70 and 72. Set screw 82 extends through a threaded cylindrical member 84 which is vertically positioned in channel member 58. Member 84 is preferably of a length which will support control rod member 68 in a horizontal relationship when the upper end of set screw 82 does not extend through the upper edge thereof. A locking nut 86 is provided to lock set screw 82 in a selected position, the significance of which will hereinbelow become more apparent.

Referring to FIGS. 3 and 5, the lower surface of support block 60 is formed with a longitudinal groove 88 formed therein to permit same to move over fasteners which secure channel member 58 to angle member 46. Block 60 is preferably molded from a plastic material to facilitate sliding movement thereof in channel member 58.

In operation, the spring member 74 serves the dual function of biasing support block 60 outward to maintain the tension in endless belt 20 and to bias the control rod member 68 into contact with either member 84 or set screw 82, as the case may be. At such time as it is necessary to skew the roller member 54 in relation to roller member 52, the locking nut 86 is loosened and set screw 82 is rotated to extend beyond the upper edge of cylindrical member 84. As set screw 82 extends beyond the upper edge of member 84, it contacts a portion of control rod member 68 causing same to raise and thereby pivot support block 60 about a horizontal axis associated with the lower edge of its outer end surface. In so pivoting support block 60, the shaft 62 is likewise pivoted and thereby causes roller member 54 to assume a skewed relationship to roller member 52. By such adjustment, a critical relationship between rollers 52 and 54 can be achieved so as to maintain equal tension on the respective edges of endless belt 20 and thereby maintain belt 20 on the rollers 52 and 54. Due to various operating conditions, it may be necessary to periodically adjust this particular relationship.

As is apparent from the above disclosure, the present invention provides a unique endless belt tracking and tensioning arrangement for use in combination with the side arm assemblies of a carton sealing machine. The endless belt arrangement maintains the required tension in the endless belt and provides means for skewing the relationship of the roller members so as to maintain the endless belt on the roller members.

Various modifications are contemplated and may obviously be resorted to by those skilled in the art without departing from the spirit and scope of the invention, as hereinafter defined by the appended claims, as only a preferred embodiment has been disclosed.

What is claimed is:

1. In combination with apparatus of the type used for sealing the foldable flaps of cartons, said apparatus including a frame structure, a sealing head means mounted to said frame structure, and a pair of facing longitudinally extending side arm assemblies mounted to said frame structure, said side arm assemblies including moving endless belts positioned to contact the side walls of said carton for movement of same past said sealing head means; an improved endless belt tracking and tensioning arrangement comprising: a first roller member journalled for rotation about a substantially vertical first shaft, said first shaft being rigidly secured to said side arm assembly; a second roller member longitudinally spaced from said first roller for rotation about a substantially vertical second shaft, said second shaft being movably mounted to said side arm assembly for movement towards and away from said first shaft; an endless belt journalled around said first and second roller members; a longitudinally extending channel member rigidly secured to said side arm assembly adjacent to said second roller member; a support block positioned within said channel member and movable longitudinally therein, said second shaft extending into said channel member and rigidly secured to said support block for movement therewith; a control rod member positioned within said channel member, said control rod member having a first end secured to said support block and a second end extending towards said first roller member; a stop means rigidly secured to said channel member intermediate the first and second ends of said control rod member; biasing means extending between said support block and said stop means for biasing said second shaft away from said first shaft; and skewing means associated with a portion of said control rod member spaced from said first end thereof for selectively raising and lowering said portion of said control rod member so as to pivot said support block about a transversely extending horizontal axis and thereby skew said second roller member relative to said first roller member.

2. The combination as defined in claim 1 wherein said channel member is substantially rectangular in transverse cross section and said support block is substantially rectangular in transverse cross section, said support block having a surface in facing relationship to said second roller member inclined downwardly away from said second roller member and towards said first roller member so as to permit said support block to pivot within said channel member.

3. The combination as defined in claim 2 wherein said skewing means includes a set screw member extending into said channel member for contact with said control rod member.

4. The combination as defined in claim 3 wherein said biasing meaning additionally biases said control rod member towards said set screw member.

5. The combination as defined in claim 4 wherein said biasing means includes a spring member received around said control rod member.

6. The combination as defined in claim 5 wherein said stop member includes a pair of spaced parallel bolt members which extend through said channel member and said rod member extends between said bolt members for movement therebetween.

7. The combination as defined in claim 6 wherein a washer member is slidably received around said rod member and positioned between said spring member and said stop means.

8. The combination as defined in claim 7 wherein said surface of said channel member in facing relationship to said second roller has a longitudinal slot formed therein for receipt of said second shaft therethrough.

9. The combination as defined in claim 3 wherein said set screw member extends through a collar member positioned within said channel member.

10. In combination with a carton conveying apparatus, said apparatus including a frame structure, and a pair of facing longitudinally extending side arm assemblies mounted to said frame structure, said side arm assemblies including moving endless belts positioned to contact the side walls of said carton for movement of same through the apparatus; an improved endless belt tracking and tensioning arrangement comprising: a first roller member journalled for rotation about a substantially vertical first shaft, said first shaft being rigidly secured to said side arm assembly; a second roller member longitudinally spaced from said first roller for rotation about a substantially vertical second shaft, said second shaft being movably mounted to said side arm assembly for movement towards and away from said first shaft; an endless belt journalled around said first and second roller members; a longitudinally extending channel member rigidly secured to said side arm assembly adjacent to said second roller member; a support block positioned within said channel member and movable longitudinally therein, said second shaft extending into said channel member and rigidly secured to said support block for movement therewith; a control rod member positioned within said channel member, said control rod member having a first end secured to said support block and a second end extending towards said first roller member; a stop means rigidly secured to said channel member intermediate the first and second ends of said control rod member; biasing means extending between said support block and said stop means for biasing said second shaft away from said first shaft; and skewing means associated with a portion of said control rod member so as to pivot said support block about a transversely extending horizontal axis and thereby skew said second roller member relative to said first roller member.

* * * * *